2,818,286

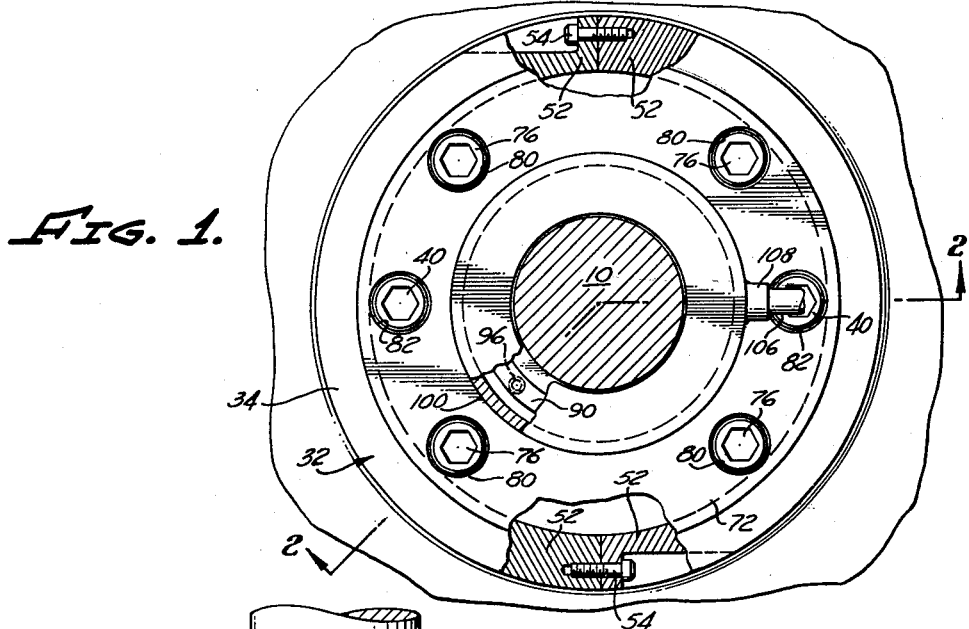
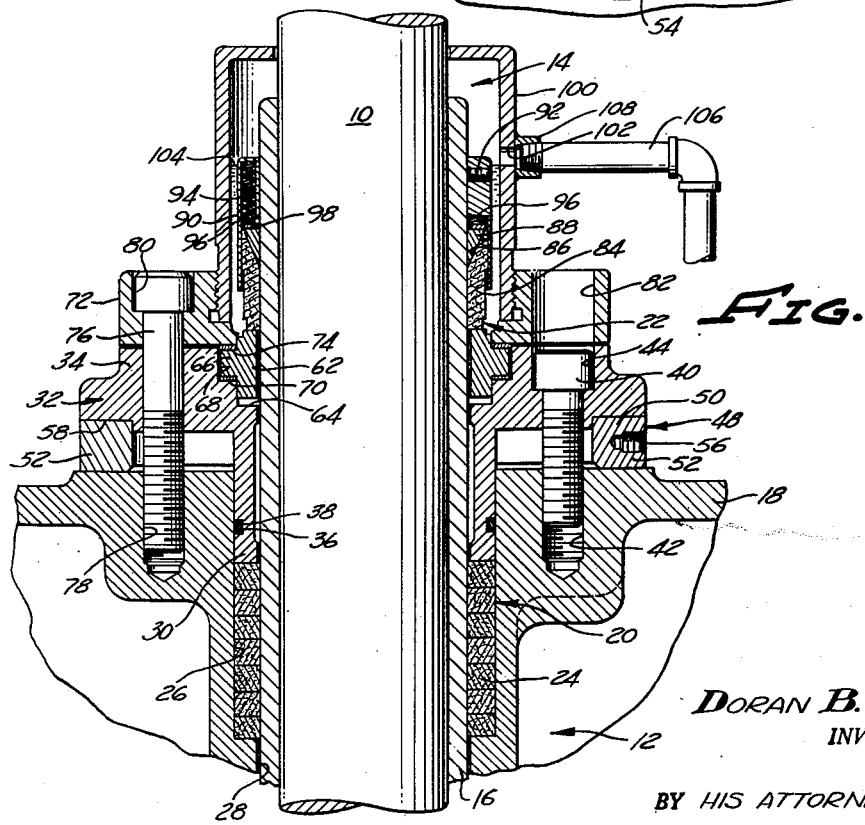
Doran B. Harney,
INVENTOR.
BY HIS ATTORNEYS.
Harris, Kiech, Foster & Harris pa# United States Patent Office 2,818,286
Patented Dec. 31, 1957

SHAFT SEALING DEVICE WITH STANDBY SEAL

Doran B. Harney, Compton, Calif., assignor to Pacific Pumps, Inc., Huntington Park, Calif., a corporation of California Application June 13, 1955, Serial No. 514,977

4 Claims. (Cl. 286—11.15)

The present invention relates to a shaft sealing device for preventing fluid leakage along a shaft from a region of relatively high pressure to one of relatively low pressure, and a primary object of the invention is to provide a shaft sealing device which includes a main seal and a standby seal, the latter coming into operation in the event of failure of the main seal for any reason, such as wear, for example.

The present invention has utility in any installation which requires maintaining pressure in the high pressure region at all times, despite such things as shaft seal failures. While not limited thereto, the invention finds particular utility when used to seal a pump shaft which extends into a treating apparatus for carrying out under pressure a process that cannot conveniently be interrupted. There may be a plurality of such pump shafts extending into the treater to drive pumps for circulating a fluid being treated under pressure, such as a hydrocarbon product being acid treated. In an installation of this character, it is frequently undesirable to interrupt the process for any reason, such as for the purpose of replacing pump shaft seals upon failure thereof, even though it is permissible to stop one or more of the pumps temporarily for shaft seal replacement purposes. However, in accordance with prior practice, the pump shaft seals cannot be replaced in equipment of this nature without interrupting the process being carried out, or at least without a loss of pressure in the treater, perhaps coupled with the discharge of fluids from the treater along the pump shafts while shaft seals are being replaced.

The present invention overcomes the foregoing and other disadvantages of prior practice by providing a shaft sealing device which, as hereinbefore indicated, includes a main seal and a standby seal, the latter coming into operation upon failure of the main seal. While the present invention has particular utility in the environment discussed in the preceding paragraph, it will be understood that it has utility in other environments also, i. e., in any environment wherein it is desired to maintain pressure in a high pressure region of a shaft and to prevent fluid leakage from such high pressure region to a low pressure region of the shaft despite seal failures.

Considering the present invention more specifically now, an important object thereof is to provide a shaft sealing device which includes a normally active sealing means encircling the shaft between the high and low pressure regions, a normally inactive sealing means encircling the shaft between the normally active sealing means and the high pressure region, and adapted to be activated to prevent leakage along the shaft from the high pressure region to the low pressure region in the event of failure of the normally active sealing means, and means for activating the normally inactive sealing means upon failure of the normally active sealing means. Thus, even though the normally active, or main, sealing means fails, the normally inactive, or standby, sealing means, which is located between the main sealing means and the high pressure region, may be activated to prevent leakage and loss of pressure from the high pressure region, which is an important feature of the invention.

Another object is to provide a standby sealing means which may either be activated temporarily to permit replacement of the main sealing means, or which may be activated for a more extended period of time to permit continued operation until a time more convenient for replacement of the main sealing means.

Another object of the invention is to provide a standby sealing means which includes a stationary member and which includes a member movable relative to the stationary member and axially of the shaft to active the standby sealing means whenever it is desired to do so.

Another object is to provide a standby sealing means which includes removable spacing means engaging the stationary and movable members mentioned to prevent movement of the movable member to activate the standby sealing means until it is desired to do so. Thus, the standby sealing means is prevented from operating until operation thereof is desired, thereby holding wear of the standby sealing means to a minimum and permitting its use over a long period of time corresponding perhaps to several main seal failures.

Another object is to provide a shaft sealing device wherein the removable spacing means mentioned includes a split ring between the stationary and movable members of the standby sealing means, and wherein the means for moving the movable member to active the standby sealing means includes bolts extending through the movable member and threaded into the stationary member.

Another object is to provide a standby sealing means which includes packing carried by the stationary member and engageable with the shaft, the movable member being a packing gland which is movable axially of the shaft to compress the packing into sealing engagement with the shaft.

Another object is to provide auxiliary sealing means between the stationary and movable members for preventing leakage therebetween.

The foregoing objects, advantages, features, and results of the present invention, together with various other objects, advantages, features and results thereof which will be quite evident to those skilled in the art in the light of this disclosure, may be attained with the exemplary embodiment of the invention illustrated in the accompanying drawing and described in detail hereinafter. Referring to the drawing:

Fig. 1 is a view, partially in end elevation and partially in transverse section, of an installation embodying a shaft sealing device of the present invention; and Fig. 2 is a longitudinal sectional view taken along the arrowed line 2—2 of Fig. 1 of the drawing.

Referring to the drawing, the numeral 10 designates a shaft which extends from a region 12 of relatively high pressure to a region 14 of relatively low pressure, the shaft 10 being, for example, a pump shaft connected to a pump impeller, not shown, in the high pressure region 12. The shaft 10 may, for example, extend into a treater, not shown, which defines the high pressure region 12 to drive a pump impeller within the treater, the shaft 10 having pressed thereon a sleeve 16 to prevent acids, for example, within the treater from coming directly into contact with the shaft. This environment is intended as illustrative only, it being understood that the invention is applicable to any environment wherein the shaft 10 extends between the high and low pressure regions 12 and 14.

Surrounding the shaft 10 is a stationary member or housing 18, which may, for example be the housing of a pump of which the shaft 10 forms a part. The shaft 10 is sealed with respect to the housing 18 by a shaft sealing device of the invention which includes a standby sealing means 20 engageable with the sleeve 16 on the shaft and a main sealing means 22 engageable therewith.

Considering the standby sealing means 20, it includes packing or sealing means 24 disposed in a counterbore 26 communicating with a bore 28 in the housing through which the shaft 10, and the sleeve 16 thereon, extend into the interior of the housing. Extending into the counterbore 26 and engageable with the packing 24 is a cylindrical sleeve 30 forming part of a packing gland 32 having an annular flange 34, the sleeve 30 having therein an annular groove 36 for an auxiliary sealing means, exemplified as an O-ring 38, for preventing fluid leakage between the housing 18 and the packing gland 32. The O-ring 38 engages the wall of the counterbore 26 in the particular construction illustrated.

As will be apparent, the packing gland 32 may be moved axially of the shaft 10 to compress the packing 24 axially, thereby expanding it radially into sealing engagement with the sleeve 16 and the housing 18. The packing gland 32 may be moved axially of the shaft 10 for this purpose by means of bolts 40 extending through the flange 34 of the packing gland and threaded into bores 42 in the housing 18, the heads of the bolts 40 being disposed in counterbores 44 in the flange 34. In order to prevent axial movement of the packing gland 32 to prevent activation of the standby sealing means 20 until such time as activation thereof is desired, a removable spacing means 48 engageable with the packing gland 32 and the housing 18 is provided. The spacing means 48 includes a split ring 50 having two sections 52 secured together by bolts or screws 54. As will be apparent, the sections 52 of the split ring 50 may be removed from between the packing gland 32 and the housing 18 after unscrewing the screws 54, the split-ring sections 52 being provided with threaded radial bores 56 for the reception of screw means, not shown, for withdrawing the split-ring sections from between the packing gland and the housing. Preferably, the split ring 50 is seated in an annular recess 58 in the packing gland 32, as shown.

The main sealing means 22 may be of any suitable type. In the particular construction illustrated, the main sealing means includes a sealing ring 62 inserted into a counterbore 64 in the packing gland 32 and having an annular flange 66 disposed in a second counterbore 68 in the packing gland. A fluid-tight seal between the sealing ring 62 and the packing gland 32 is provided by a gasket 70. The sealing ring 62 is retained in the counterbores 64 and 68 by a retaining ring 72, a gasket 74 being interposed between the sealing ring and the retaining ring. The retaining ring 72 is secured in place by bolts 76 extending through the packing gland 32 and threaded into bores 78 in the housing 18, the retaining ring 72 being provided with counterbores 80 receiving the heads of the bolts 76. The retaining ring 72 is also provided with bores 82 therethrough aligned with the recesses 44 in the packing gland to provide access to the bolts 40. Engaging the sealing ring 62 and rotatable with the shaft 10 is a second sealing ring 84 provided at its upper end with a tapered surface 86 which is engaged by a wedge-shaped ring 88 in fluid-tight contact with the sleeve 16 on the shaft 10. A retainer 90 surrounds the rings 84 and 88 and is secured to the sleeve 16 on the shaft 10 by a set screw 92, the retainer having therein bores 94 containing compression springs 96 which are seated on a washer 98 engaging the upper end of the wedge-shaped ring 88. As will be apparent, the springs 96 act through the washer 98 to bias the wedge-shaped ring 88 into engagement with the sleeve 16 on the shaft 10 and to bias the sealing ring 84 into engagement with the sealing ring 62, it being apparent that the tapered surface 86 of the sealing ring 84 co- operates with the wedge-shaped ring 88 to bias the latter into engagement with the sleeve 16 on the shaft.

Connected to the retaining ring 72, as by being threaded thereinto, is a cup-shaped enclosure or housing 100 for the main sealing means 22, the shaft 10 extending through the upper end of this enclosure. In one side of the enclosure 100 is an overflow port 102 which permits maintaining a liquid, such as oil, in the enclosure at a level 104. An overflow pipe 106 communicates with the overflow port 102, and is shown as threaded into a boss 108 on the enclosure. In addition to serving an overflow function, the pipe 106 may be used to fill the enclosure 100 with oil, or other suitable liquid.

Considering the operation of the shaft sealing device of the invention, the various components are in the positions shown in the drawing, and the enclosure 100 is filled with oil to the oil level 104.

The spacing means 48 prevents activation of the standby sealing means 20 to prevent wear thereof. Thus, leakage along the shaft 10 from the high pressure region 12 to the low pressure region 14 is prevented by the main sealing means 22. The foregoing conditions obtain until failure of the main sealing means 22 occurs.

Eventually, after prolonged rotation of the shaft 10, the main sealing means 22 will fail. That is, the main sealing means 22 will begin to permit fluid leakage from the high pressure region 12 into the low pressure region 14, due, for example, to excessive wear of the sealing ring 84 and/or the sealing ring 62. Failure of the main sealing means 22 resulting in fluid leakage into the low pressure region 14 is manifested by overflow through the overflow pipe 106.

When such failure of the main sealing means 22 occurs, the standby sealing means 20 is activated in the following manner. First, the bolts 40 and 76 are loosened slightly to permit removal of the spacing means 48. The latter may be removed by unscrewing the screws 54 to disconnect the split-ring sections 52, whereupon the sections may be removed from between the gland 32 and the housing 18, as by screw means, not shown, threaded into the bores 56 in the split-ring sections. Thereafter, the bolts 40 are tightened to move the gland 32 axially of the shaft 10 sufficiently to produce the necessary axial compression of the packing 24, whereupon this packing is expanded radially to provide a fluid-tight seal between the housing 18 and the sleeve 16 on the shaft 10. If resired, the bolts 76 may also be tightened, but this is unnecessary.

With the foregoing accomplished, which is usually done with the shaft 10 stationary, fluid leakage from the high pressure region to the low pressure region 14 can no longer occur, despite the failure of the main sealing means 22, which is an important feature of the invention. If desired, the shaft 10 may now be rotated for an indefinite period of time, utilizing the standby sealing means 20 to prevent fluid leakage. The standby sealing means 20 may be utilized to prevent fluid leakage for substantial periods of time by tightening up on the packing 24 from time to time.

The main sealing means 22 may be repaired or replaced at any convenient time. For example, the main sealing means may be replaced immediately after activation of the standby sealing means 20, or after prolonged operation of the shaft utilizing the standby sealing means to prevent fluid leakage. In either event, it will be apparent that the main sealing means 22 may be repaired or replaced readily merely by removing the retaining ring 72 and the attached enclosure 100, this being accomplished by removing the bolts 76 which secure the retaining ring 72 in place. As will be apparent, this may be accomplished without affecting the standby sealing means 20, since it is independently activated by means of the bolts 40. After the main sealing means 22 has been repaired or replaced, which is preferably done with the shaft 10 stationary, the standby sealing means 20 is preferably again rendered inactive by reinstalling the spacing means 48, reversing the procedure hereinbefore outlined. Such inactivation of the standby sealing means 20 prevents wear thereof so that it is available for future duty upon the next failure of the main sealing means 22, which is an important feature.

Thus, it will be apparent that the sealing function is ordinarily performed by the main sealing means 22, the sealing means 20 being present on a standby basis and being activated only upon failure of the main sealing means. The standby sealing means 20 may either be utilized as a replacement for the main sealing means 22 to permit continued rotation of the shaft 10 until such time as it is convenient to replace the main sealing means, or the standby sealing means may be utilized only to provide a temporary seal preventing leakage along the shaft 10 while the main sealing means is being repaired or replaced. At any time while the standby sealing means 20 is not in use, it is rendered inactive by the spacing means 48 to prevent unnecessary wear thereof. Thus, the life of the standby sealing means 20 may be several times that of the main sealing means 22, which is an important feature.

The present invention thus provides a shaft sealing device which avoids any necessity for a complete shutdown of the installation in connection with which the shaft 10 is used, and avoids anything more than a brief, temporary shutdown of the shaft 10 itself, either for the purpose of activating the standby sealing means 20, or for the purpose of both activating the standby sealing means 20 temporarily and replacing the main sealing means 22.

Although I have disclosed an exemplary embodiment of the invention herein for purposes of illustration, it will be understood that various changes, modifications and substitutions may be incorporated therein without departing from the spirit of the invention as defined by the claims allowed to me and appearing hereinafter. For example, while the shaft sealing device of the invention has been described as applied to a vertically oriented shaft 10, it will be understood that vertical shaft orientation is unnecesary. Also, while specific sealing means have been illustrated and described for the standby sealing means 20 and the main sealing means 22, it will be understood that various departures from the specific disclosures made are possible within the scope of the invention.

I claim as my invention:

1. In a shaft sealing device for preventing fluid leakage along a shaft from a region of relatively high pressure to one of relatively low pressure, the combination of: a normally inactive sealing means encircling said shaft between said regions and adapted to be activated to prevent leakage along said shaft from said high pressure region to said low pressure region, said normally inactive sealing means including a stationary member, activatable sealing elements within said stationary member, and a member movable relative to said stationary member axially of said shaft to activate said sealing elements; means for so moving said movable member; and normally active sealing means encircling said shaft between said normally inactive sealing means and said low pressure region, said normally active sealing means including two interengageable, annular sealing elements one carried by said shaft and the other carried by said movable member.

2. In a shaft sealing device for preventing fluid leakage along a shaft from a region of relatively high pressure to one of relatively low pressure, the combination of: a normally inactive sealing means encircling said shaft between said regions and adapted to be activated to prevent leakage along said shaft from said high pressure region to said low pressure region, said normally inactive sealing means including a stationary member, packing within said stationary member, and a gland movable relative to said stationary member axially of said shaft to compress said packing and thus activate said normally inactive sealing means; means for so moving said gland; and normally active sealing means encircling said shaft between said normally inactive sealing means and said low pressure region, said normally active sealing means including two interengageable, annular sealing elements one carried by said shaft and the other carried by said gland.

3. In a shaft sealing device for preventing fluid leakage along a shaft from a region of relatively high pressure to one of relatively low pressure, the combination of: a normally inactive sealing means encircling said shaft between said regions and adapted to be activated to prevent leakage along said shaft from said high pressure region to said low pressure region, said normally inactive sealing means including a stationary member, packing within said stationary member, and a gland movable relative to said stationary member axially of said shaft to compress said packing and thus activate said normally inactive sealing means; means for so moving said gland; removable spacing means between said gland and said stationary member for preventing the specified movement of said gland; and normally active sealing means encircling said shaft between said normally inactive sealing means and said low pressure region, said normally active sealing means including two interengageable, annular sealing elements one carried by said shaft and the other carried by said gland.

4. In a shaft sealing device for preventing fluid leakage along a shaft from a region of relatively high pressure to one of relatively low pressure, the combination of: a normally inactive sealing means encircling said shaft between said regions and adapted to be activated to prevent leakage along said shaft from said high pressure region to said low pressure region, said normally inactive sealing means including a stationary member, packing within said stationary member, and a gland having an end engageable with said packing, said gland being movable relative to said stationary member axially of said shaft to compress said packing and thus activate said normally inactive sealing means, said gland having an annular recess in its other end; means for so moving said gland; removable spacing means between said gland and said stationary member for preventing the specified movement of said gland; normally active sealing means encircling said shaft between said normally inactive sealing means and said low pressure region, said normally active sealing means including two interengageable, annular sealing elements one carried by said shaft and the other disposed in said recess in said gland; and means engaging said other sealing element and connected to said gland for retaining said other sealing element in said recess.

References Cited in the file of this patent

UNITED STATES PATENTS

| 724,086 | Davis | Mar. 31, 1903 |
| 811,642 | Key | Feb. 6, 1906 |
| 1,015,884 | Haaser | Jan. 30, 1912 |
| 1,805,710 | Wilkins | May 19, 1931 |